United States Patent
Classon (10) Patent No.: US 7,944,981 B2
(45) Date of Patent: May 17, 2011

(54) DATA TRANSMISSION IN A FREQUENCY DIVISION MULTIPLE ACCESS COMMUNICATION SYSTEM

(75) Inventor: Brian K. Classon, Palatine, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 875 days.

(21) Appl. No.: 11/756,034

(22) Filed: May 31, 2007

(65) Prior Publication Data

US 2008/0298477 A1 Dec. 4, 2008

(51) Int. Cl.
*H04K 1/10* (2006.01)
(52) U.S. Cl. .......................... 375/260; 455/59
(58) Field of Classification Search ............ 375/260
See application file for complete search history.

(56) References Cited

U.S. PATENT DOCUMENTS

| | | | |
|---|---|---|---|
| 2007/0064949 A1* | 3/2007 | Choi et al. | 380/270 |
| 2007/0247392 A1* | 10/2007 | Littrell | 345/8 |
| 2007/0248075 A1* | 10/2007 | Liu et al. | 370/349 |
| 2007/0258402 A1* | 11/2007 | Nakamata et al. | 370/329 |
| 2007/0260956 A1* | 11/2007 | Terry et al. | 714/748 |
| 2007/0265016 A1* | 11/2007 | Kahtava et al. | 455/452.2 |
| 2008/0219236 A1* | 9/2008 | Love et al. | 370/347 |
| 2008/0253318 A1* | 10/2008 | Malladi et al. | 370/328 |
| 2008/0279170 A1* | 11/2008 | Malladi et al. | 370/343 |
| 2008/0287155 A1* | 11/2008 | Xu et al. | 455/522 |
| 2008/0293424 A1* | 11/2008 | Cho et al. | 455/450 |
| 2008/0298477 A1* | 12/2008 | Classon | 375/260 |
| 2009/0028129 A1* | 1/2009 | Pi et al. | 370/351 |
| 2009/0047912 A1* | 2/2009 | Lee et al. | 455/69 |
| 2009/0232062 A1* | 9/2009 | Higuchi et al. | 370/329 |
| 2009/0262699 A1* | 10/2009 | Wengerter et al. | 370/330 |

OTHER PUBLICATIONS

Durga Prasad Malladi, "Re: LTE Control Signaling," eMail to 3gpp reflector on Jan. 11, 2007 suggests that only 1 effective RB may be allocated for control in 6RB allocation, with 1st slot bottom and 2nd slot top. The "extra" unoccupied slots on the top and bottom RB are used by a single freequency diverse allocation. In other words, the top and bottom RBs each have one slot coded together. This creates an undesired restriction when FS scheduling is desired . . . only 4 RBs of FS data are possible., Jan. 11, 2007.

* cited by examiner

*Primary Examiner* — Chieh M Fan
*Assistant Examiner* — Santiago Garcia (57) ABSTRACT

When a UE (102) determines that non-control data needs to be transmitted, the UE will receive a grant that comprises information identifying a resource block (RB) for transmissions by the UE. If the UE determines that the RB is also used for transmitting control data, it will know to transmit only over the portion of the RB used for non-control data transmissions. Rate matching will then be performed on the non-control data that needs to be transmitted and the non-control data will be transmitted only over a portion of the RB. The second portion of the RB will be used for normal control data transmissions by other UEs.

8 Claims, 5 Drawing Sheets

FIG. 1

FIG. 3
Prior-art

DATA TRANSMISSION IN A FREQUENCY DIVISION MULTIPLE ACCESS COMMUNICATION SYSTEM

FIELD OF THE INVENTION

The present invention relates generally to Frequency Division Multiple Access communication systems and, in particular, to transmission of uplink user data in such communication systems.

BACKGROUND OF THE INVENTION

For the uplink of future broadband systems, single-carrier based approaches with orthogonal frequency division are of interest. These approaches, particularly Interleaved Frequency Division Multiple Access (IFDMA) and its frequency-domain related variant known as DFT-Spread-OFDM (DFT-SOFDM), are attractive because of their low peak-to-average power ratio (PAPR), frequency domain orthogonality between users, and low-complexity frequency domain equalization. Collectively, single carrier based approaches with orthogonal frequency division may be known as single carrier based frequency division multiple access (SC-FDMA).

A DFT-SOFDM modulation scheme has been proposed for uplink transmissions over an air interface in the 3GPP (Third Generation Partnership Project) E-UTRA (Evolved UMTS Terrestrial Radio Access) communication system. In a DFT-SOFDM communication system, a frequency bandwidth is split into multiple contiguous frequency sub-bands, or sub-carriers, that are transmitted simultaneously. These sub-carriers are orthogonal to each other. A user may then be assigned one or more of the frequency sub-bands for an exchange of user information, thereby permitting multiple users to transmit simultaneously on the different sub-carriers. Additional sub-carriers are reserved for transmission of control data.

In DFT-SOFDM, uplink control data may be divided into two categories. A first category, data-associated control data, is control signaling (i.e., control data) that is always transmitted with, and used in the processing, of an uplink user data packet. Examples of this control data include transport format, new data indicator, and MIMO parameters. It has been proposed that all uplink transmission parameters be controlled by a Node B since it may be costly to provide reliable control data.

A second category of control data, that is, control data not associated with user non-control data, also known as user data non-associated control data, is control data that is transmitted independently of an uplink user data packet. Examples of this control data include acknowledgments (ACK/NACK), Channel Quality Information (CQI), and Multiple-Input Multiple-Output (MIMO) codeword feedback. In the absence of an uplink non-control data transmission, this control data is transmitted in a frequency region reserved for control data. Specifically, it has been proposed to utilize resources on the top and bottom of the frequency band for such control transmissions, with half of the transmission in a top resource block (RB) (e.g., 12 contiguous subcarriers) of the band during a first 0.5 ms slot and the second part of the transmission in a bottom RB of the band in the second 0.5 ms slot of the subframe. This achieves both frequency diversity and preserves single carrier transmission.

A problem exists for non-data-associated control data in that for small total bandwidths (e.g., 6 resource blocks (RBs)) the overhead for 1 RB top and 1 RB bottom is excessive. A second problem is that for odd number of RBs assigned for control, the top and bottom each will have e.g., 0.5, 1.5, 2.5, . . . RBs. Non-integer RBs (e.g., 6 subcarrier) on each of top and bottom may make CDM multiplexing of control between users more difficult. Particularly, it may be desired to CDM multiplex a number (e.g., 6-8) of users within each RB, and fewer than the desired number of users may be multiplexed in 0.5 RB (e.g., 6 subcarriers).

Therefore a need exists for a method and apparatus for non-data-associated control data within a frequency division multiple access communication system that alleviates the above mentioned problems.

DETAILED DESCRIPTION OF THE DRAWINGS

In order to address the above-mentioned need, a method and apparatus for data transmission in a frequency division multiple access communication system is provided herein. During operation, when a UE determines that non-control data needs to be transmitted, the UE will receive a grant that comprises information identifying a resource block (RB) for transmissions by the UE. If the UE determines that the RB is also used for transmitting control data, it will know to transmit only over a portion of the RB used for non-control data transmissions. Rate matching will then be performed on the non-control data that needs to be transmitted and the non-control data will be transmitted only over a portion of the RB. The second portion of the RB will be used for normal control data transmissions by other UEs.

The above technique provides for reduced overhead from where 1 RB top and 1 RB bottom is control data transmissions. Additionally, the above technique allows for an odd number of RBs assigned for control.

The present invention encompasses a method comprising the steps of determining that non-control data needs to be transmitted by user equipment (UE), receiving a grant identifying a resource block (RB) for transmissions of the non-control data, and determining that the RB is also used for transmitting control data by other UEs. Rate matching is then performed on the non-control data and the non-control data is transmitted on only a portion of the RB.

The present invention additionally encompasses a method comprising the steps of determining that non-control data needs to be transmitted, receiving a grant that identifies a resource block (RB) for transmitting the non-control data, and determining a total number of RBs used for transmitting control data. If the total number of RBs used for transmitting control data is an odd number and if the RB for transmitting the non-control data is also used for transmitting control data, then rate matching is performed on the non-control data that needs to be transmitted and the non-control data is transmitted only on a portion of the RB, while failing to transmit on a second portion of the RB. However, if the total number of RBs used for transmitting control data is an even number, then rate matching is performed on the non-control data that needs to be transmitted and the non-control data is transmitted on the whole RB.

The present invention additionally encompasses a method comprising the steps of receiving a request from a first UE to transmit non-control data, transmitting a grant message assigning the first UE an RB used for transmitting control data, receiving non-control data from the first UE over a first portion of RB assigned to receive control data, and receiving control data from a second UE over a second portion of the RB.

The present invention additionally encompasses an apparatus comprising a receiver receiving a grant identifying a resource block (RB) for transmissions of the non-control data, a processor determining that the RB is also used for transmitting control data by other UEs, an encoder performing rate matching on the non-control data, and a transmitter transmitting the non-control data on only a portion of the RB.

Figure 1:
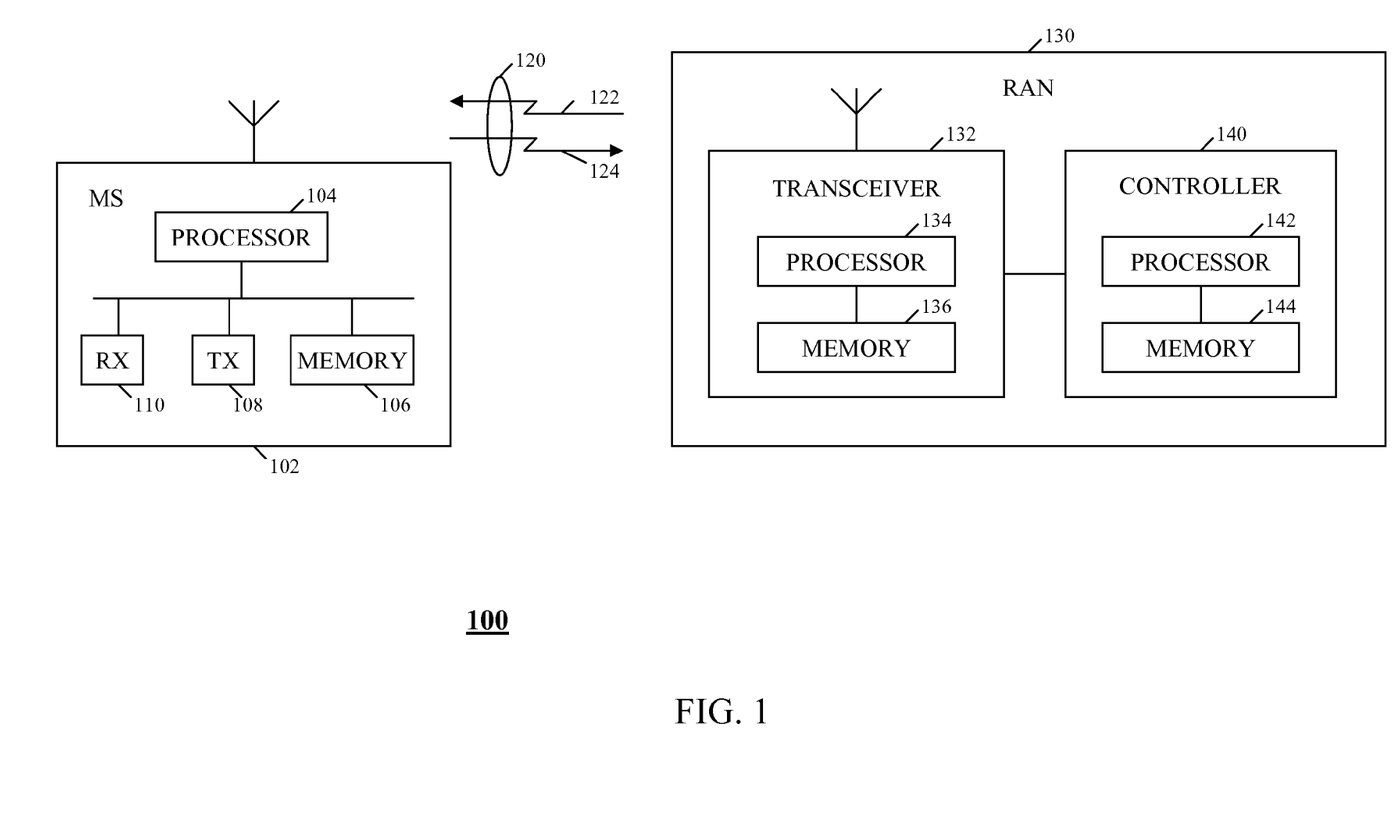
FIG. 1 is a block diagram of a wireless communication system in accordance with an embodiment of the present invention.

Turning now to the drawings, wherein like numerals designate like components, FIG. 1 is a block diagram of wireless communication system 100. Communication system 100 includes user equipment (UE) 102 that is provided wireless communication services by a radio access network (RAN) 130 via an air interface 120. UE 102 may be any type of portable wireless device. For instance, UE 102 may be a cellular telephone, a radiotelephone, a pager, or a Personal Digital Assistant (PDA), personal computer (PC), or laptop computer equipped for wireless communications. Other examples of user equipment are possible.

RAN 130 includes a transceiver 132, such as a Node B or a base transceiver station (BTS), coupled to a controller 140, such a radio network controller (RNC) or a base station controller (BSC). Air interface 120 comprises downlink communication signal 122 and uplink communication signal 124. Each of downlink communication signal 122 and uplink communication signal 124 comprises multiple physical communication channels, including multiple control channels and multiple traffic channels.

Each of UE 102, transceiver 132, and controller 140 includes a respective processor 104, 134, 142 such as one or more microprocessors, microcontrollers, digital signal processors (DSPs), combinations thereof or such other devices known to those having ordinary skill in the art. The particular operations/functions of processors 104, 134, and 142 and respectively thus of UE 102, transceiver 132, and controller 140, are determined by an execution of software instructions and routines that are stored in a respective at least one memory device 106, 136, 144 associated with the processor, such as random access memory (RAM), dynamic random access memory (DRAM), and/or read only memory (ROM) or equivalents thereof, that store data and programs that may be executed by the corresponding processor. UE 102 further comprises at least one transmitter 108 and at least one receiver 110 that are coupled to processor 104 and that provide for transmission and reception of information via air interface 120.

Unless otherwise specified herein, the embodiments of the present invention preferably are implemented within UE 102, transceiver 132, and RAN 130. One of ordinary skill in the art realizes that the embodiments of the present invention may be implemented in software, or hardware, for example, integrated circuits (ICs), application specific integrated circuits (ASICs), and the like, such as ASICs implemented in one or more of UE 102, transceiver 132, and RAN 130. Based on the present disclosure, one skilled in the art will be readily capable of producing and implementing such software and/or hardware without undo experimentation.

Communication system 100 preferably utilizes either OFDMA or a next generation single-carrier based FDMA architecture for uplink transmissions 124, such as interleaved FDMA (IFDMA), Localized FDMA (LFDMA), DFT-spread OFDM (DFT-SOFDM) with IFDMA or LFDMA. While these can be classified as single-carrier based transmission schemes with a much lower peak-to average power ratio (PAPR) than OFDM, they can also be classified as multicarrier schemes in the present invention because they are block-oriented like OFDM and can be configured to occupy only a certain set of "subcarriers" in the frequency domain like OFDM. Thus IFDMA and DFT-SOFDM can be classified as both single-carrier and multicarrier since they have single carrier characteristics in the time domain and multicarrier characteristics in the frequency domain.

Figure 2:
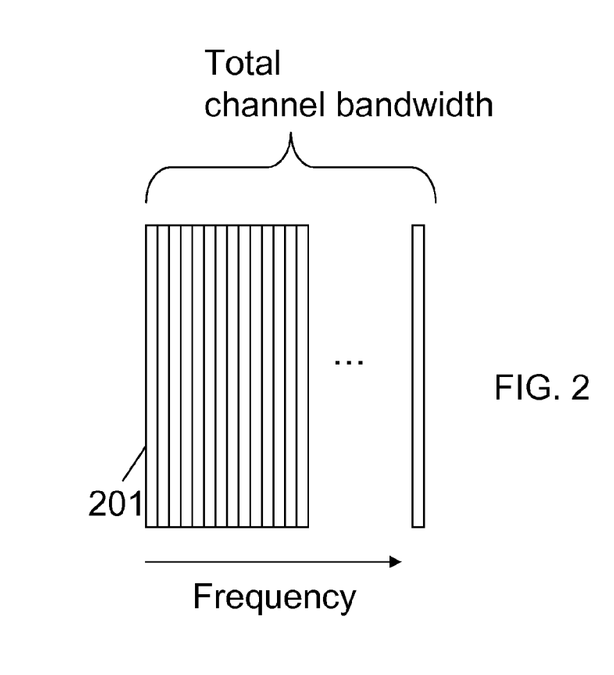
FIG. 2 illustrates a wideband channel divided into many narrow frequency bands (subcarriers).

As one of ordinary skill in the art will recognize, even though IFDMA and DFT-SOFDM can be seen as single-carrier-based schemes, during operation of an IFDMA system or a DFT-SOFDM system, multiple subcarriers (e.g., 768 subcarriers) are utilized to transmit data. This is illustrated in FIG. 2. As shown in FIG. 2 the wideband channel is divided into many narrow frequency bands (subcarriers) 201, with data being transmitted in parallel on subcarriers 201. However, a difference between OFDMA and IFDMA/DFT-SOFDM is that in OFDMA each data symbol is mapped to a particular subcarrier, whilst in IFDMA/DFT-SOFDM a portion of each data symbol is present on every occupied subcarrier (the set of occupied subcarriers for a particular transmission may be a either a subset or all of the subcarriers). Hence in IFDMA/DFT-SOFDM, each occupied subcarrier contains a mixture of multiple data symbols.

In addition to OFDMA, communication system 100 utilizes Adaptive Modulation and Coding (AMC). With AMC, the modulation and coding format of a transmitted data stream for a particular receiver is changed to predominantly match a current received signal quality (at the receiver) for the particular frame being transmitted. The modulation and coding scheme may change on a frame-by-frame basis in order to track the channel quality variations that occur in mobile communication systems. Thus, streams with high quality are typically assigned higher order modulations rates and/or higher channel coding rates with the modulation order and/or the code rate decreasing as quality decreases. For those receivers experiencing high quality, modulation schemes such as 16 QAM, 64 QAM or 256 QAM are utilized, while for those experiencing low quality, modulation schemes such as BPSK or QPSK are utilized. The selected modulation and coding may only predominantly match the current received signal quality for reasons such as channel quality measurement delay or errors, channel quality reporting delay or errors, efforts to measure or predict current and future interference, and efforts to measure or predict the future channel.

Multiple coding rates may be available for each modulation scheme to provide finer AMC granularity, to enable a closer match between the quality and the transmitted signal characteristics (e.g., $R=\frac{1}{4}$, $\frac{1}{2}$, and $\frac{3}{4}$ for QPSK; $R=\frac{1}{2}$ and $R=\frac{2}{3}$ for 16 QAM, etc.).

A user may be assigned one or more of the frequency sub-carriers for an exchange of bearer information, thereby permitting multiple users to transmit simultaneously on the different set of sub-carriers such that each user's transmission is orthogonal to the other users' transmissions. In typical operation, a user is generally assigned at least one resource block (RB) for transmission of information. More particularly, the channel bandwidth is divided into several subbands, which may be called tiles or resource blocks. Each resource block is used for a particular transmission over a particular time interval, and includes several adjacent subcarriers and spans multiple symbol periods. For example, a resource block with a 15 kHz subcarrier spacing and a 4.76 us cyclic prefix length could be defined as containing 12 adjacent subcarriers (~180 kHz), and the minimum time that a resource block can be assigned for, given the ~4.76 us cyclic prefix, could be seven or fourteen symbol periods (~0.5 or ~1 msec). Also note that one or more of the time-frequency resources of transmission on a resource block may contain pilot symbols to support coherent demodulation of data on other time-frequency elements, though pilot or reference symbols for the user are typically not located within the same symbol period for SC-FDMA. When allocating resources to a user, it is convenient and efficient to allocate in terms of predefined resource blocks for predefined periods of time in order to reduce resource assignment signaling overhead.

Further, communication system 100 preferably operates in accordance with the 3GPP (Third Generation Partnership Project) E-UTRA (Evolved UMTS Terrestrial Radio Access) standards, which standards specify wireless telecommunications system operating protocols, including radio system parameters and call processing procedures. However, those who are of ordinary skill in the art realize that communication system 100 may operate in accordance with any wireless telecommunication system employing an Orthogonal Frequency Division Multiplexing (OFDM) based modulation scheme, such as a 3GPP2 (Third Generation Partnership Project 2) Evolution communication system, for example, a CDMA (Code Division Multiple Access) 2000 1XEV-DV communication system, a Wireless Local Area Network (WLAN) communication system as described by the IEEE (Institute of Electrical and Electronics Engineers) 802.xx standards, for example, the 802.11a/HiperLAN2, 802.11g, or 802.16 standards, or any of multiple proposed ultra-wideband (UWB) communication systems.

Communication system 100 further may provide for guaranteed delivery of data packets conveyed over air interface 120, for example, by use of any well known guaranteed-delivery protocol such as an automatic repeat request (ARQ) protocol or a hybrid ARQ (HARQ) protocol. As is known in the art, such protocols use acknowledgments, such as an ACK and/or a NACK, to identify data packets that have been correctly received, erroneously received, or not received.

Communication system 100 selectively schedules each UE operating in the communication system, such as UE 102, for use of one or more sub-carriers of a frequency bandwidth employed by the communication system. In doing so, transceiver 132 provides UE 102 with a downlink control message, preferably an uplink scheduling grant, via a control channel of downlink communication signal 122. The grant includes a UE identifier (UE ID) and scheduling information for a scheduling period, such as an uplink resource assignment and uplink transmission parameters. The uplink resource assignment may comprise, in the case of localized transmission over a contiguous number of resource blocks, a starting resource block and number of resource blocks, as separate fields, a joint field. The UE ID indicates a UE for which the grant is intended, and may be explicit or implicit, such as through a user specific CRC. The uplink transmission parameters indicate transmission parameters, such as a modulation scheme, a payload size, Multiple-Input Multiple-Output (MIMO)-related information, and so on, that the identified UE shall use. Part of a resource assignment or transmission parameter may be derived from other transmitted resource assignment or transmission parameter. For example, in some cases any one of the number of resource blocks, payload size, modulation, and code rate may be determined from the other parameters.

Figure 3:
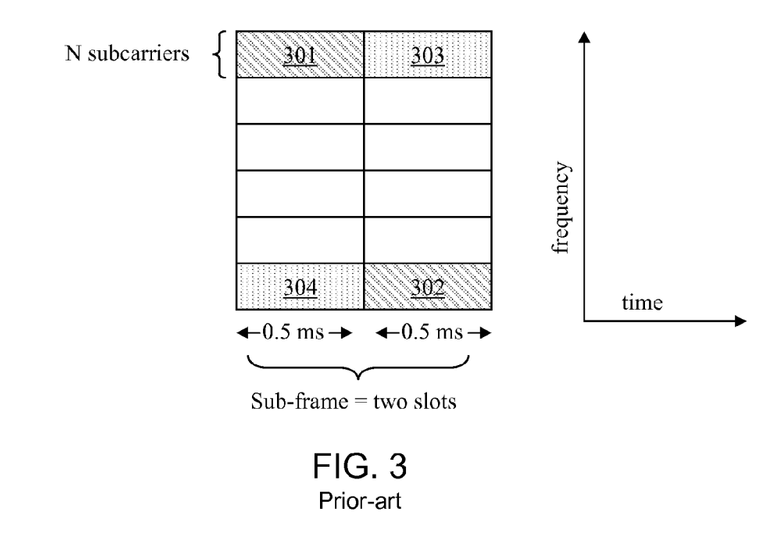
FIG. 3 illustrates prior-art uplink non-data associated control data.

In prior art single carrier OFDM communication systems, uplink non-data associated control signaling (i.e., non-data associated control data) is sent over one or more sub-carriers separate from the sub-carriers comprising user non-control data. This is illustrated in FIG. 3. In the absence of an uplink data transmission, this control data is transmitted in an RB reserved for control data only. In order to obtain frequency diversity, it has been proposed to utilize RBs on the top and bottom of the frequency band for such control data transmissions, with half of the transmission in a top resource block (RB) of the band during a first 0.5 ms slot and the second part of the transmission in a bottom RB of the band in the second 0.5 ms slot of the subframe. Note that for this example, an RB is defined as 12 contiguous subcarriers spanning 0.5 ms, not including uplink sounding and reference signals, however, one or ordinary skill in the art will recognize that an RB may be defined as any number of contiguous subcarriers for any amount of time. Thus, referring to FIG. 3, a first UE will utilize RBs 301 and 302 for transmitting control data, while a second UL will utilize RBs 303 and 304 for the transmission of control data. Additional UEs may also be multiplexed together with either the first UE in RBs 301 and 302 or with the second UE in RBs 303 and 304, such as by CDM or FDM multiplexing. Any non-control data will be transmitted outside of RBs 301-304.

As discussed above, a problem exists for non-data-associated control data in that for small total number of RBs (e.g., 6 RBs) the overhead for 1 RB top and 1 RB bottom is excessive. A second problem is that for odd number of RBs assigned for control, the top and bottom each will have e.g., 0.5, 1.5, 2.5, . . . RBs. Non-integer (e.g., 6 subcarrier) RBs on each of top and bottom may make CDM multiplexing of control between users more difficult. Particularly, it may be desired to CDM multiplex a number (e.g., 6-8) of users within each RB, and fewer than the desired number of users may be multiplexed in 0.5 RB (e.g., 6 subcarriers).

In order to address this issue, UE 102 will have logic such that when a resource block is assigned to the UE for control data, the UE will know that it is only to transmit during certain time periods over the N subcarriers that make up the resource block. For example, if an RB is defined as N subcarriers over 1 ms (two slots), the UE will only use ½ of the RB (one slot) for transmitting data. Rate matching may be utilized in order to fit the data into the ½ of the RB. For example, the data rate may be increased via adjustment of the MCS. Non-control data can then be transmitted in other time periods within the RB. This is illustrated in FIG. 4.

Figure 4:
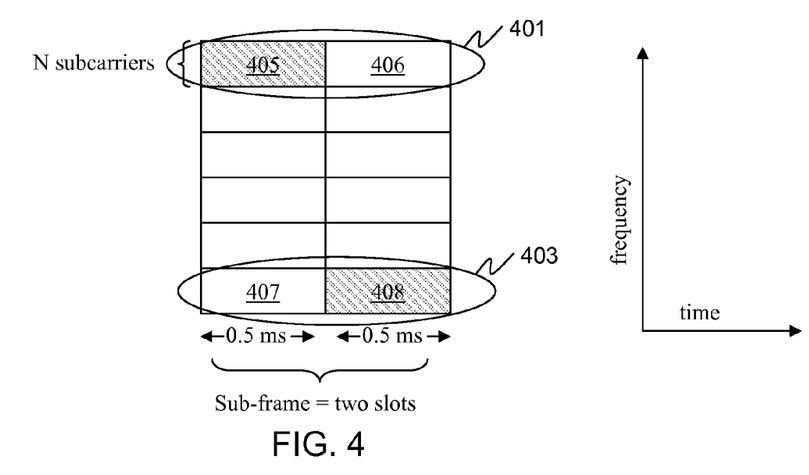
FIG. 4 illustrates uplink non-data associated control data.

With reference to FIG. 4, UEs will only be assigned a portion of an RB for transmitting non-associated control data (e.g., acknowledgments (ACK/NACK), Channel Quality Information (CQI), and Multiple-Input Multiple-Output (MIMO) codeword feedback). Thus, for example, any UE that is assigned RBs 401 and 403 will know that the UE is only to transmit within ½ of each RB (shaded areas 405 and 408 of each RB in FIG. 4). Normal non-control data can then be transmitted by other UEs within the RB during portions 406 and 407. Thus, unlike the prior art (FIG. 3), the rest of the RB is utilized for normal UE non-control data transmissions. It should be noted that non-control data continues to be transmitted by UEs outside of RBs 401 and 403.

Thus when a UE determines that non-control data needs to be transmitted, the UE will receive a grant that comprises information identifying a resource block (RB) for transmissions by the UE. If the UE determines that the RB is also used for transmitting control data, it will know to transmit only over the portion of the RB used for non-control data transmissions. Rate matching will then be performed on the non-control data that needs to be transmitted and the non-control data will be transmitted only over a portion of the RB, while failing to transmit on a second portion of the RB. In other words, the second portion of the RB will be used for normal control data transmissions by other UEs.

Non-integer number of RB transmission (or odd number of RB transmission if an RB is defined as a single slot) is therefore supported. In general, non-control data may be transmitted in a localized (adjacent RB) or frequency hopped (each RB worth of non-control data sent on one slot of a first RB and a second slot of a second RB) manner while maintaining low PAPR. The entire localized data transmission therefore may only be on a portion of the RB, of size ½ RB or one slot, or may be only on a portion of the RB and fully occupying other adjacent RB identified in the grant for non-control data transmission, of total size 1.5, 2.5, 3.5, etc. RB. Note that the number of bits required for an uplink resource assignment may be greater than what would be needed in the prior art. For example, for a 1.25 MHz system with 6 total RB, the prior art may have 1 RB top and bottom for control, with 4 RB available for data addressable with 2 bits. In FIG. 4, 3 bits are needed to address 6 RB available for data transmission. In this example, all 6 RBs may be used for localized data transmissions by one or multiple UEs.

As discussed above, all UEs will have knowledge of what RBs are utilized for transmitting control data and whether or not the RB will be fully utilized. This information may be provided to an individual UE as part of the uplink scheduling grant, via a control channel of downlink communication signal 122. In addition to those elements contained in the grant discussed above, the grant will also include an indication that the first or last or both first and last RB of the assignment occupies only one slot of the RB. This could be via a 1 bit field, where a 1 indicates that partial RB occupancy will occur. Whether the first or last or both first and last RB occupy only one slot is determined from the resource assignment by determining whether the first or last RB could be also used for transmitting control data. In particular, due to the symmetric nature of the control region reserved at the top and bottom of the band, only the closest allocated RB to a band edge may be used for control. In the case that all resources are assigned to the user, both the first and last RB will occupy only one slot of the RB.

An alternate approach for providing knowledge of the control data in the uplink grant is to send the total number of control RBs. The UE can then compare the RBs that the total number of control RBs will occupy or partially occupy to the resource assignment to determine whether an RB is also used for control data. In either case, for an RB that has one slot for control data and one slot for non-control data, it will be known to both the node B and the UE which slot is for control and which is for non-control (predetermined or via higher layer signaling).

The UEs may also learn what RBs are utilized for transmitting control data and whether or not the RB will be fully utilized via higher layer signaling, such as a broadcast channel message. The received message comprises a total number of resource blocks used for transmitting control data. As above, the UE can then compare the RBs that the total number of control RBs will occupy or partially occupy to the resource assignment to determine whether an RB is also used for control data.

As discussed above, to determine that an RB is also used for transmitting control data from other UEs, a total number of RBs or resources used for control may be transmitted, either within the uplink grant or higher layer broadcast signaling or the like. In an alternate embodiment, the total number of control RBs is a target number. The total number of control RBs may be a (minimum) target number, where the node B may assign additional resources beyond the minimum target number. In this case, the node B will simply not assign data users to the additional resources used for control. The additional resources used for control may occur on an as-needed basis if more non-data associated control data needs to be sent, and the additional resources may be implicitly (e.g., ACK/NACK) or explicitly (e.g., CQI) assigned. A localized transmission assigned an RB outside of the (minimum) control region would use the full RB for transmission. The total number of control resources may also be a (maximum) target number. The node B may determine that, at a given subframe, fewer than the target number of control resources are required, such as when little or no downlink traffic is occurring and as a result less non-data associated control data needs to be sent. In such a case, the node B may, assuming that the UL grant address space for assigning resource blocks is dimensioned appropriately, assign RBs for transmission that may at other times be used for control. If a localized transmission is assigned an RB that is usually entirely used for control given the target maximum number of control RBs, then either a portion (one slot) or all of that RB will be used for transmission, where using either a portion or all of the RB is known (predetermined or signaled).

The above technique for transmitting control data may take place even when a large number of RBs are available for transmission. This is because for an odd number of RBs assigned for control data transmissions, the top and bottom each will have e.g., 0.5, 1.5, 2.5, . . . RBs. Non-integer RBs on each of top and bottom may make CDM multiplexing of control between users more difficult. Therefore, in a second embodiment of the present invention, the above technique is utilized when an odd number of RBs are used for transmitting control data. During such a scenario, if the total number of RBs used for transmitting control data is an odd number there will be one RB at the top and bottom of the band that could contain both control data and non-control data. If a particular RB is used for transmitting control and non-control data, then rate matching on the non-control data is performed and the non-control data is transmitted only on a portion of the RB. The UE will not transmit on a second portion of the RB. However, if the total number of RBs used for transmitting control data is an even number, then rate matching is performed on the data that needs to be transmitted and the data is transmitted on a whole RB not utilized for transmitting control data.

The description above assumes that the system bandwidth is divided into an integer total number of e.g. 12 subcarrier RBs. However, there may be cases where the total data region is an integer number of 12 subcarrier RBs, but the control region contains either extra subcarriers or a single different sized RB on the edges of the band. For example, it may be determined that spectral masks and out of band emissions targets may be met with 78 subcarriers. In this case, there may be 4 RBs of 12 subcarriers and two band edge RBs of 15 subcarriers. In addition, in order to place DC distortion from certain transmitters and receivers in between two resource blocks, the band edge RBs may be made larger (18 subcarriers) or smaller (6 subcarriers). Larger is preferred for multiplexing a desired number of users control data. For example, in a 5 MHz system with 25 (an odd number) of total RBs, there may be two 18 subcarrier RBs at the band edges and 22

12 subcarrier RBs (11 on each side of DC) in the center of the band. In any case, the embodiments of the invention still apply.

Figure 5:
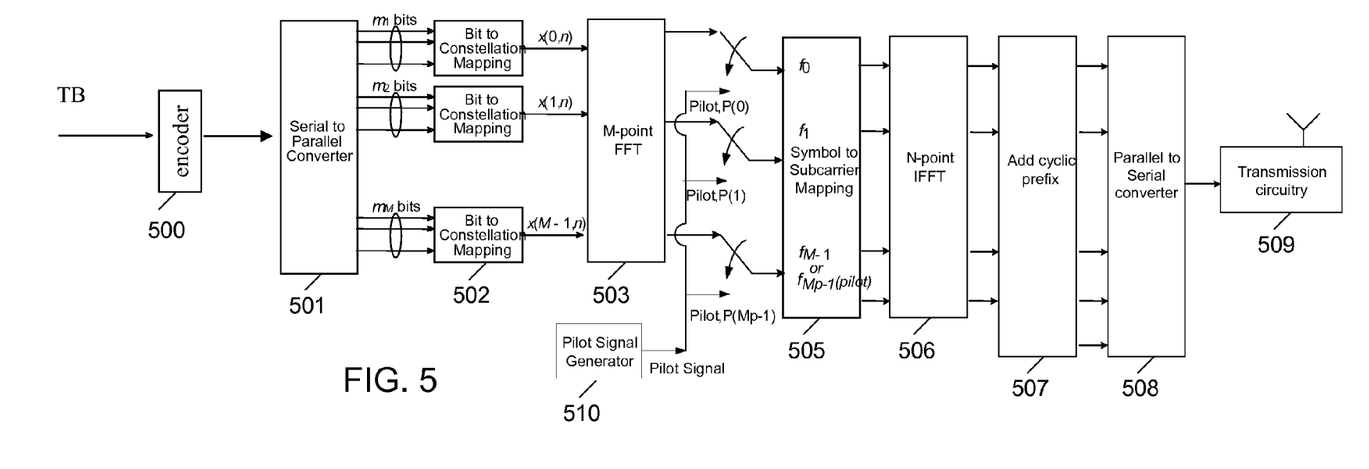
FIG. 5 is a block diagram of a transmitter of FIG. 1.

FIG. 5 is a more-detailed block diagram of transmitter 108. A transport block (TB), which may comprise control or non-control data is channel encoded via encoder 500, such as with a turbo code, with the output of the channel encoding rate matched to fit the available resources for transmission. The effective coding rate for transmission is then approximately the TB size divided by the product of the number of RBs, the size of an RB in modulation symbols (e.g., 144 for 12 subcarriers times 12 symbol periods not used for sounding or reference symbols), and the modulation order (e.g., 2 for QPSK, 4 for 16QAM, etc.). The number of RBs may be non-integer if an RB is 1 ms (2 slots), or odd if an RB is defined as one slot of data (with grants then identifying an RB-pair for transmissions of the non-control data). When an RB has both control data and non-control data the node B can either send less data (a smaller TB) with the same approximate code rate or could increase the effective data rate (modulation and/or coding rate) to send the same amount of data.

Blocks 501, 502, and 506-509 are very similar to a conventional OFDM/OFDMA transmitter, while blocks 503 and 505 are unique to DFT-SOFDM. As with conventional OFDM, the IDFT size (or number of points, N) is typically larger than the maximum number of allowed non-zero inputs. More specifically, some inputs corresponding to frequencies beyond the edges of the channel bandwidth are set to zero, thus providing an over sampling function to simplify the implementation of the subsequent transmission circuitry, as is known in the art. As described earlier, different subcarrier bandwidths may be used on pilot blocks than on data blocks, corresponding to different pilot block and data block lengths. In the transmitter of FIG. 5, different subcarrier bandwidths can be provided by different IDFT sizes (N) for pilot blocks and data blocks. For example, a data block may have N=512, and the number of usable subcarriers within the channel bandwidth may be B=384. The specific set of subcarriers out of the usable ones that are occupied by a data block or a pilot block are determined by the mapping block 505. In the pilot signal generator block 510 the frequency-domain pilot symbols are generated and are fed to the symbol to subcarrier mapping block 505.

A cyclic prefix is added by circuitry 507 followed by a parallel to serial converter 508. Also, although not shown, additional spectral shaping can be performed on the DFT-SOFDM signal to reduce its spectral occupancy or reduce its peak-to average ratio. This additional spectral shaping is conveniently implemented by additional processing before IDFT 506, and may for example be based on weighting or overlap-add processing. Finally the signal is sent over the RF channel through use of transmission circuitry 509.

Figure 6:
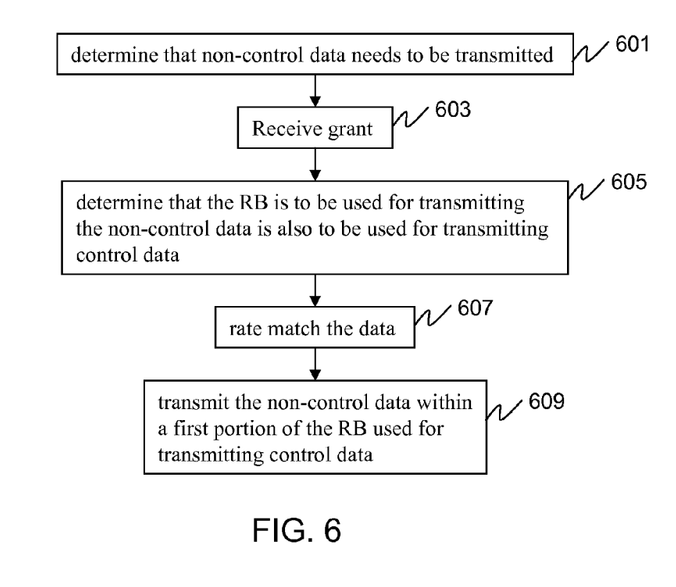
FIG. 6 is a flow chart showing operation of the UE of FIG. 5 for a first embodiment of the present invention.

FIG. 6 is a flow chart showing operation of the UE of FIG. 5 for a first embodiment of the present invention. For the logic flow of FIG. 6, an RB comprises 2 slots in a DFT spread OFDM transmission and occupies several adjacent subcarriers and spans multiple symbol periods (e.g., 12 contiguous subcarriers spanning 1 ms, not including uplink sounding and reference signals).

The logic flow begins at step 601 where processor 104 determines that non-control data needs to be transmitted. At step 603 a grant is received by receiver 110 via downlink communication signal 122. As discussed above, the grant comprises information identifying a first resource block (RB) to be for transmitting the non-control data. Additionally, the grant may also identify a total number of RBs to be used and provide an indication that at least one RB is also used to transmit control data. In addition to identifying the RB, the grant may identify no additional RB for data transmission or may identify one or more additional adjacent RBs for data transmission.

Continuing, processor 104 then determines (step 605) that the first RB is to be used for transmitting the non-control data is also to be used for transmitting control data. This determination is made by analyzing the grant, however in alternate embodiments, this determination may be made from analyzing any received message indicating the RB is also to be used for transmitting control data. For example, a control message may be received via downlink signal 122 identifying the RB and a total number of resource blocks used for transmitting control data.

Processor 104 then instructs encoder 500 to properly rate match the data using AMC so that it will fit into a portion of the first RB assigned (step 607). A portion may be one slot of the assigned first RB. Finally, at step 609 transmission circuitry 509 transmits the non-control data within a first portion of the first RB used for transmitting control data. Control data can then be transmitted on a second portion of the first RB by another UE. Additionally, control data may be transmitted by the UE at a later time period on portion of an RB occupying the same frequency band as the first RB.

Figure 7:
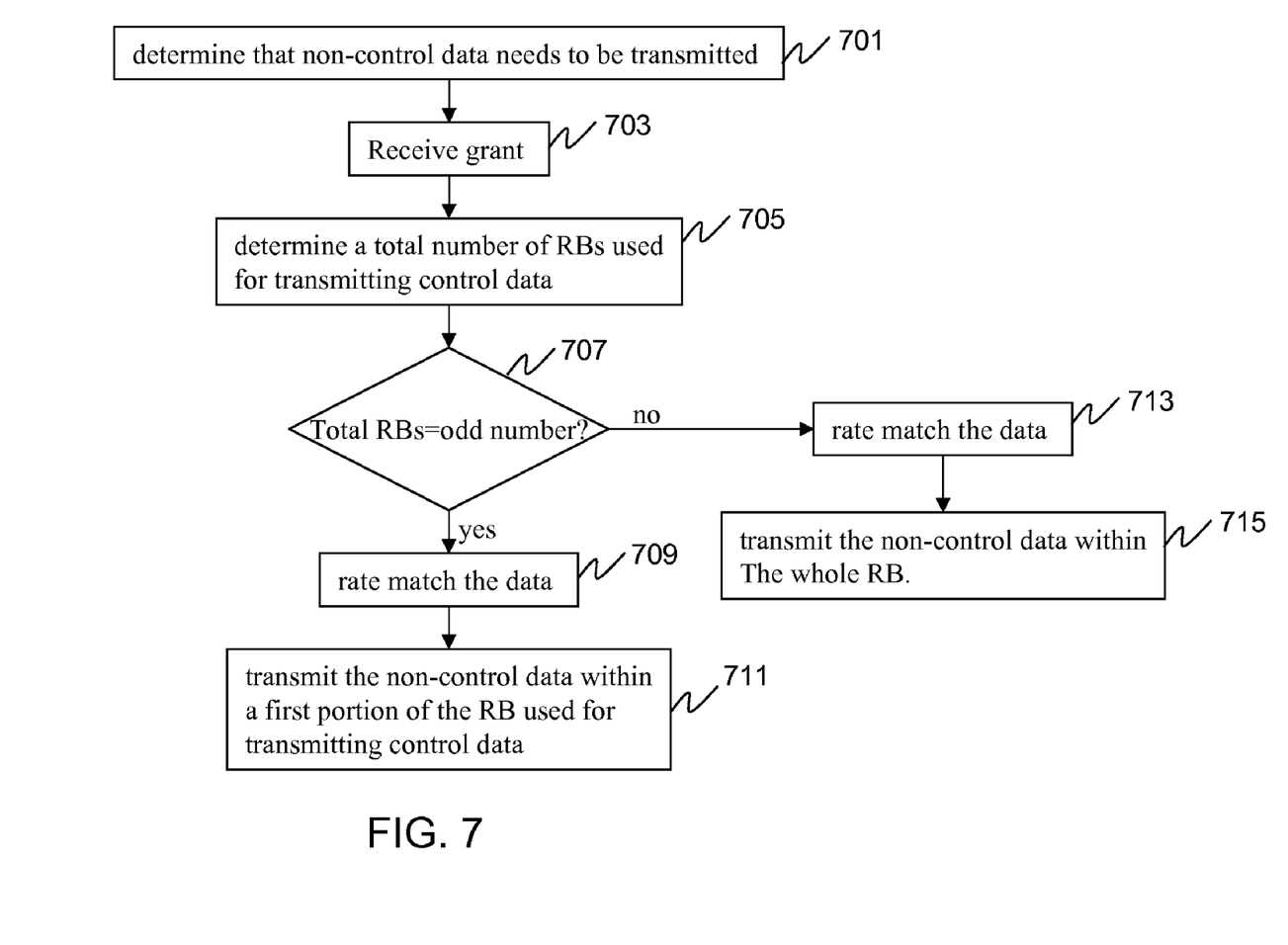
FIG. 7 is a flow chart showing operation of the UE of FIG. 5 for a second embodiment of the present invention.

FIG. 7 is a flow chart showing operation of the UE of FIG. 5 for a second embodiment of the present invention. During the second embodiment of the present invention, non-control data will be transmitted within an RB reserved for transmitting control data when an odd number of RBs are reserved for transmitting control data. The logic flow begins at step 701 where processor 104 determines that non-control data needs to be transmitted. At step 703 a grant is received by receiver 110 that identifies a resource block (RB) for transmitting the non-control data. Processor 104 determines a total number of RBs used for transmitting control data (step 705). This information may be obtained by receiving the total number of RBs used for control data via a control message, such as the UL grant or a higher layer or broadcast message. However, in an alternate embodiment this determination may be made by analyzing the grant fields and determining the effective (as seen by the UE) total number of RBs used for control data, such as by examining the assigned set of RBs and reading an indication that the first or last or both first and last RB of the assignment occupies only one slot of the RB. At step 707, processor 104 then determines if the total number of RBs used for transmitting control data is an odd number and if so the logic flow continues to step 709, otherwise the logic flow continues to step 713.

At step 709, encoder 500 performs rate matching on the non-control data that needs to be transmitted. The logic flow ends at step 711 where transmission circuitry 509 transmits the non-control data only on a portion of the RB. No data will be transmitted on a second portion of the RB, as that portion will be reserved for control data transmissions.

At step 713, encoder 500 performs rate matching on the non-control data that needs to be transmitted. The logic flow ends at step 715 where transmission circuitry 509 transmits the non-control data only the whole RB.

Figure 8:
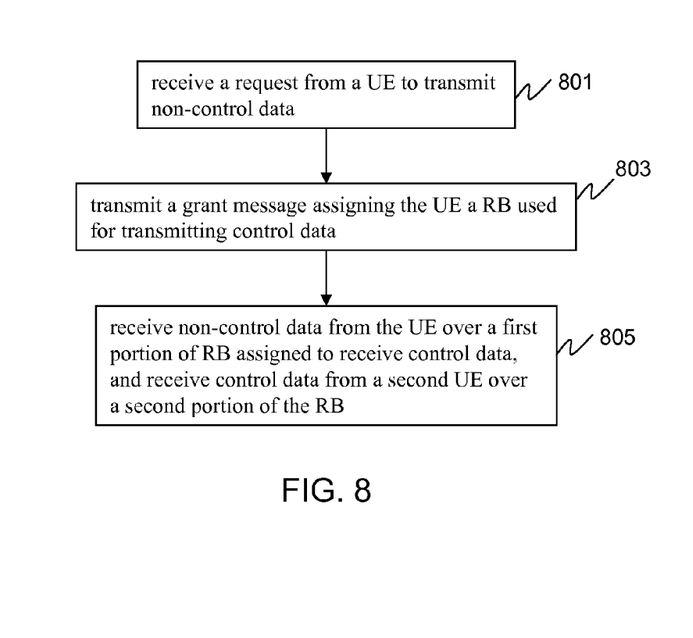
FIG. 8 is a flow chart showing operation of a node B.

FIG. 8 is a flow chart showing operation of a node B. During operation transceiver 132 receives a request from a UE to transmit non-control data (step 801). At step 803, processor 134 instructs transceiver to transmit a grant message assigning the UE an RB used for transmitting control data. The grant message may further assign either no additional RB for data transmission or one or more additional adjacent RB for data transmission. In response, at step 805 transceiver 132 receives non-control data from the UE over a first portion of RB assigned to receive control data, and receives control data from a second UE over a second portion of the RB.

While the invention has been particularly shown and described with reference to a particular embodiment, it will be understood by those skilled in the art that various changes in form and details may be made therein without departing from the spirit and scope of the invention. It is intended that such changes come within the scope of the following claims.

The invention claimed is:

1. A method comprising the steps of:
   determining that non-control data needs to be transmitted;
   receiving a grant that identifies a resource block (RB) for transmitting the non-control data;
   determining a total number of RBs used for transmitting control data;
   if the total number of RBs used for transmitting control data is an odd number and if the RB for transmitting the non-control data is also used for transmitting control data, then performing at least the steps of:
      performing rate matching on the non-control data that needs to be transmitted;
      transmitting the non-control data only on a portion of the RB, while failing to transmit on a second portion of the RB;
   if the total number of RBs used for transmitting control data is an even number, then performing at least the step of:
      performing rate matching on the non-control data that needs to be transmitted;
      transmitting the non-control data on the whole RB.

2. The method of claim 1 wherein the RB for transmitting the non-control data comprises several adjacent subcarriers and spans multiple symbol periods, and wherein the grant further identifies either no additional RB for data transmission or an additional adjacent RB for data transmission.

3. The method of claim 2 wherein the RB for transmitting the non-control data comprises 12 contiguous subcarriers spanning 1 ms, not including uplink sounding and reference signals.

4. The method of claim 1 wherein the portion of the RB comprises a slot in a DFT spread OFDM transmission.

5. An apparatus comprising:
   a processor determining that non-control data needs to be transmitted;
   a receiver receiving a grant that identifies a resource block (RB) for transmitting the non-control data;
   the processor determining a total number of RBs used for transmitting control data;
      an encoder performing rate matching on the non-control data that needs to be transmitted if the total number of RBs used for transmitting control data is an odd number and if the RB for transmitting the non-control data is also used for transmitting control data;
      a transmitter transmitting the non-control data only on a portion of the RB, while failing to transmit on a second portion of the RB if the total number of RBs used for transmitting control data is an odd number and if the RB for transmitting the non-control data is also used for transmitting control data;
      the encoder performing rate matching on the non-control data that needs to be transmitted if the total number of RBs used for transmitting control data is an even number; and
      the transmitting the non-control data on the whole RB if the total number of RBs used for transmitting control data is an even number.

6. The apparatus of claim 5 wherein the RB for transmitting the non-control data comprises several adjacent subcarriers and spans multiple symbol periods, and wherein the grant further identifies either no additional RB for data transmission or an additional adjacent RB for data transmission.

7. The apparatus of claim 6 wherein the RB for transmitting the non-control data comprises 12 contiguous subcarriers spanning 1 ms, not including uplink sounding and reference signals.

8. The method of claim 5 wherein the portion of the RB comprises a slot in a DFT spread OFDM transmission.

* * * * *